July 4, 1950
B. M. NASE
2,513,349
TUBEMAKING MACHINE
Filed Oct. 23, 1946
3 Sheets-Sheet 1
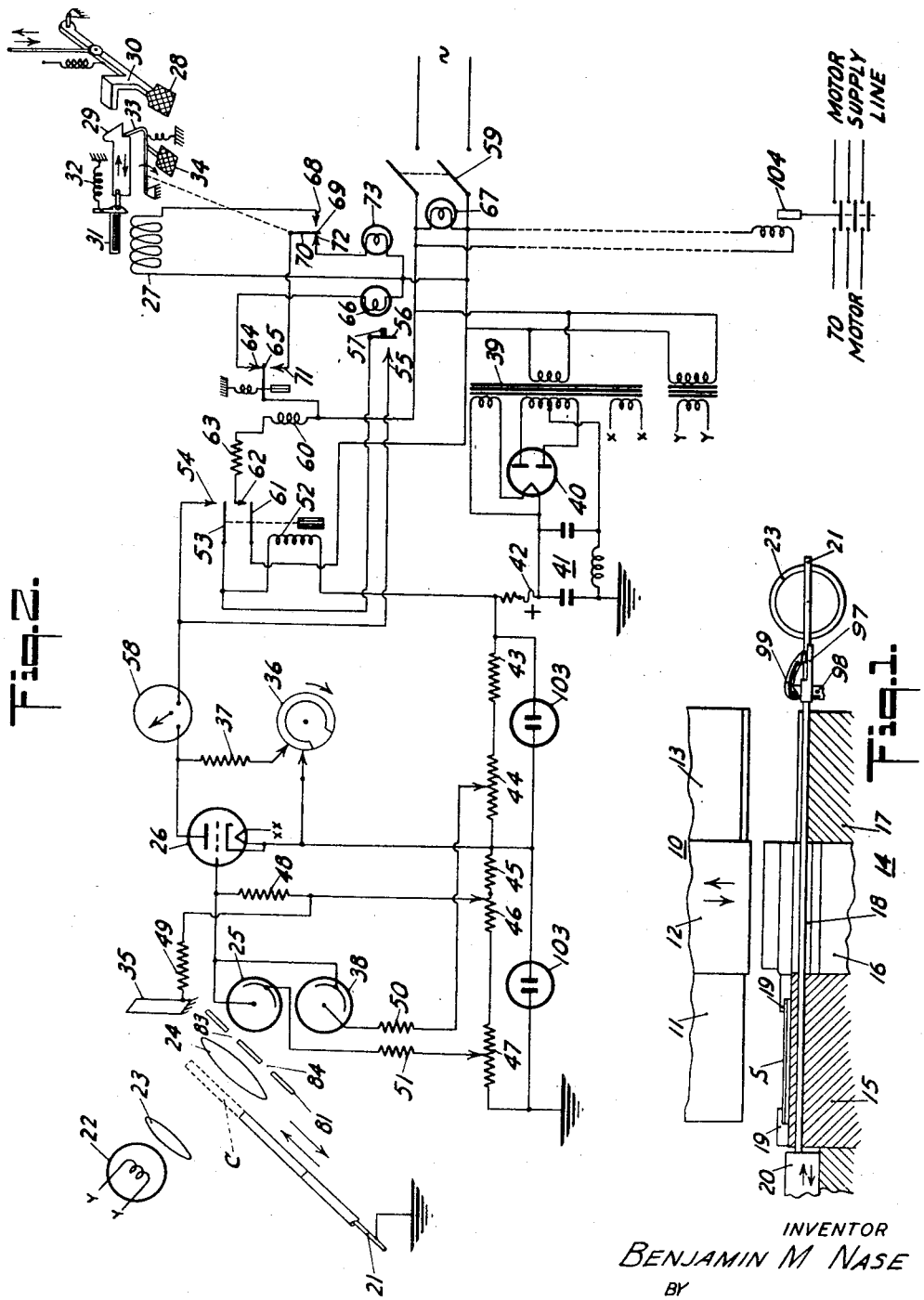
INVENTOR
BENJAMIN M NASE
BY
Woodcock and Phelan
ATTORNEYS July 4, 1950  B. M. NASE  2,513,349
TUBEMAKING MACHINE
Filed Oct. 23, 1946  3 Sheets-Sheet 2
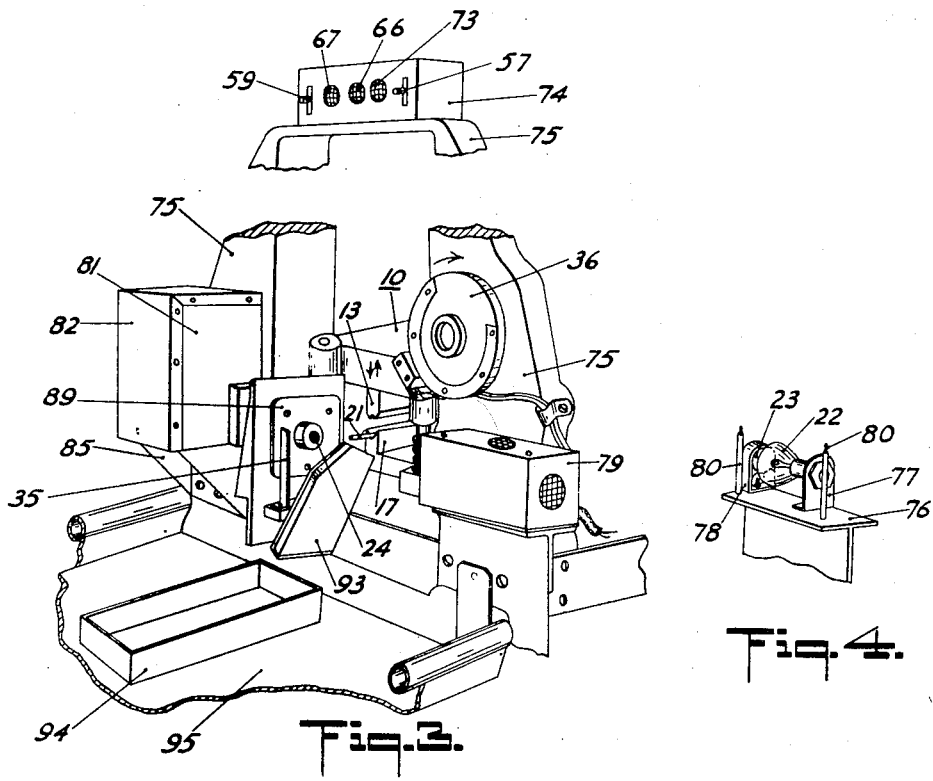
Fig.3.
Fig.4.
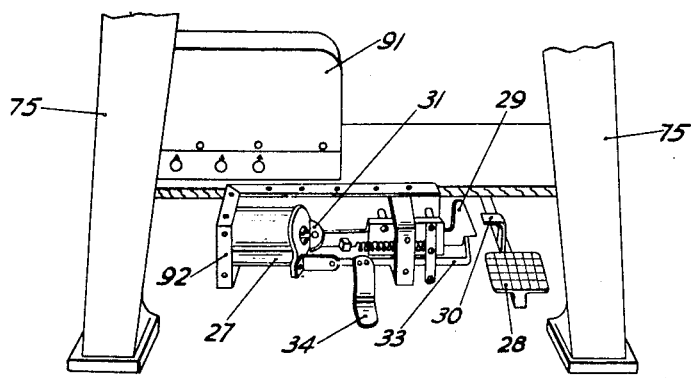
Fig.5.
INVENTOR
BENJAMIN M NASE
BY
Woodcock and Phelan
Attorneys July 4, 1950  B. M. NASE  2,513,349
TUBEMAKING MACHINE
Filed Oct. 23, 1946  3 Sheets-Sheet 3
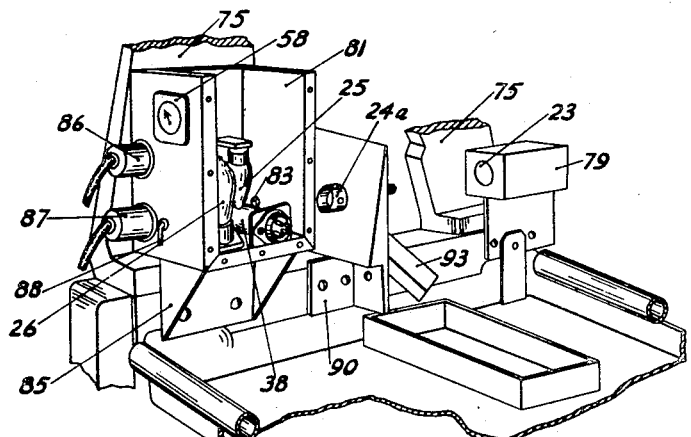
Fig.6.
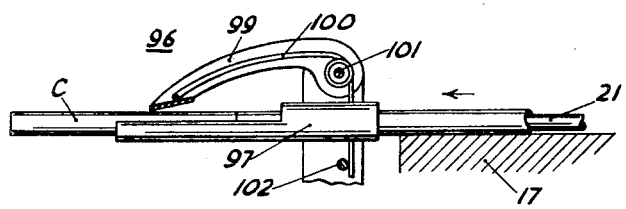
Fig.7.
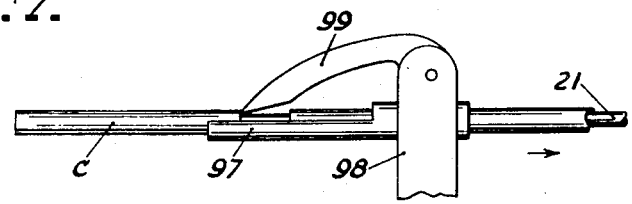
Fig.8.
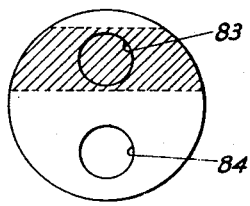
Fig.2-A.
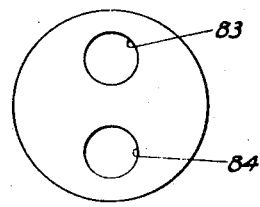
Fig.2-B.
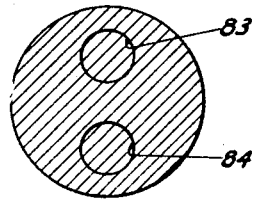
Fig.2-C.
INVENTOR
BENJAMIN M. NASE
BY
Woodcock and Phelan
ATTORNEYS Patented July 4, 1950

2,513,349

UNITED STATES PATENT OFFICE 2,513,349

TUBE MAKING MACHINE

Benjamin M. Nase, Lederach, Pa., assignor to Superior Tube Company, Norristown, Pa., a corporation of Pennsylvania Application October 23, 1946, Serial No. 705,015

4 Claims. (Cl. 113—33)

This invention relates to machines for making tubular structures, such as electrodes for thermionic tubes, from blank stock.

In machines of the type disclosed in U. S. Letters Patent No. 2,116,971 to Haslauer, the removal of tubular electrodes from a mandrel over which they are shaped is dependent upon continued feed of the stock from which the electrodes are made. Consequently, upon depletion of the stock or failure of its feed, the electrodes last formed on the mandrel are not stripped therefrom.

In accordance with the present invention, there is provided a positive stripping means normally effective in each cycle of the machine to remove from the mandrel a tube finished in a prior cycle or earlier part of the same cycle so that the lack of a tube on the mandrel, as viewed at an inspection station, at a predetermined part of each cycle will be in consequence of failure of the machine to form a tube.

Further in accordance with this invention, the positive stripping means coacts with an automatic monitoring system to effect discontinuance of operation of the tube-forming machine whenever the mandrel for any reason fails to transfer to the inspection station another tube in replacement of the one earlier removed by the stripping means.

The invention further resides in features of construction, combination and arrangement herein disclosed and claimed.

For a more detailed understanding of the invention, reference is made to the accompanying drawings, in which:

Fig. 1 is a side view, partly in section, of the die-blocks of an electrode-forming machine and the associated stripping device;

Fig. 2 schematically illustrates a monitoring system and associated elements of the electrode-forming machine;

Figs. 2-A, 2-B and 2-C are explanatory figures;

Fig. 3 is a perspective view showing the physical arrangement of components of the monitoring system and of the controlled machine;

Fig. 4 is a perspective view of the light source with its cover omitted;

Fig. 5 is a partial front view of the lower part of the machine showing its control pedals and the automatic de-clutching solenoid;

Fig. 6 is a perspective view showing parts appearing in Fig. 3 from another angle and with the cover removed from the housing for the photo-cells and control tube; and Figs. 7 and 8 are detail views of the stripping device of Fig. 1.

Referring to Fig. 1, the upper die-block 10 of the machine comprises an upper blanking die 11, an upper forming die 12, and an upper finishing die 13 which in each cycle of the machine move in unison toward and from the lower die-block 14 which comprises the lower blanking die 15, the mandrel-supporting and seam-closing slide 16, the lower finishing die 17, and the seam-forming tools 18 (only one is shown). As in detail explained in the aforesaid Haslauer patent, in each cycle of the machine the blanking dies 11 and 15 coact to sever a blank from the strip S fed between them in a path determined by the guides 19. During each cycle and at a second station, the upper forming die 12 during its descent bends a previously cut blank over a mandrel 21 which is prevented from deflecting by the slide 16 then in its uppermost position. When the die 12 dwells in its lowermost position, the slide 16 moves downwardly and the tools 18 operate in sequence to form a lock-seam; before die 12 moves upwardly, the slide 16 again moves up to press the seam into a groove in the mandrel. During each cycle and at the third station, the dies 13 and 17 coact accurately to shape and dimension the seamed cathode formed in the previous cycle at the second station.

The feeding of the blanks and of the tubular structures or electrodes formed therefrom is effected by a reciprocating block 20 and the mandrel 21 extending therefrom. In each cycle of the machine and while the die blocks are separated, the mandrel 21 is retracted or moved to the left, Fig. 1: Each of the tubular electrodes on the mandrel, however, is prevented from moving; the one just formed at the second station because of its engagement with the stop formed by the right-hand face of lower die-block 15 and the one just finished at the third station by its engagement with the electrode at the second station. During the retraction of the mandrel, the electrode or tube finished in the preceding cycle at the third station is therefore stripped off the front or free end of the mandrel at a fourth station. In the immediately following forward or feeding movement of the block and mandrel, a pusher-piece, not shown, advances the previously cut blank to the second or forming station, and the row of tubes or electrodes on the mandrel move with it, each to the next station. Thus, the last finished electrode is moved to the fourth station in front of the finishing dies for removal from the mandrel during the stripping operation in the next cycle.

It is while the mandrel is in this forward position and while the upper die-block is down that the front end of the mandrel is inspected to check proper functioning of the machine in the previous cycle.

With the machine as thus far described, if there is failure of die 11 to cut a tube blank because of depletion of the stock or failure of the stock feed, there is no tube formed at the bending station in the next cycle of the machine and consequently no addition to the row of tubes on the mandrel: as a result, further reciprocations of the mandrel are ineffective to advance the row of tubes thereon and the last-finished tube merely repeatedly rides back and forth with the mandrel to and from the inspection station, generically represented in Fig. 1 by the circle 23, which may be at the aforesaid fourth station. Simply from inspection of the end of the mandrel, it therefore cannot be determined whether the machine has or has not made a tube in the preceding cycle of its operation.

Particularly when operation of the machine is to be supervised by an automatic monitoring system of character later herein disclosed, it is desirable in each cycle of the machine positively to strip from the end of the mandrel the foremost or last-finished tube. Thus a subsequent failure of delivery to the discharge end of the mandrel of a further finished tube, whether because of depletion of the stock or for any other reason, will cause the machine to be shut down. This occurs when the mandrel, as viewed at the inspection station, is bare after not more than a few cycles at most and preferably at the end of that cycle in which the machine first fails to form a tube.

The preferred positive stripping device, as shown in Figs. 1, 7 and 8, comprises a tubular guide 97 of internal size and shape closely corresponding with the outside dimensions and shape of the tubes C being formed by the machine and disposed with its axis in accurate alignment with the axis of the mandrel 21. The forward upper part of the guide is cut away to expose the tubes on the mandrel for engagement by flipper 99, or equivalent stripper structure, pivoted at 101 on the support 98 which is preferably fastened to the frame of the machine between the finishing die 17 and the inspection station generically represented in Fig. 1 by circle 23.

The free end of flipper 99 is biased, as by spring 100, continuously toward the mandrel and is so directed that during the forward or feeding movement of the mandrel it permits the tubes to pass freely. However, upon reverse or retractive movement of the mandrel, the tip of the flipper 99 catches the end of the foremost tube, Fig. 8, or its bead, if beaded electrodes are being made, and so prevents the tube just inspected from returning with the mandrel. Ultimately, as the retractive motion of the mandrel continues, the end tube is stripped from it. It is thus insured that the end of the mandrel is cleared in each cycle of the machine after each inspection period and regardless of whether or not the row of tubes on the mandrel has been advanced with respect thereto by engagement with the aforesaid stop structure provided by the right-hand face of die-block 15, Fig. 1.

As hereinafter appears, the machine is suited for making tubes varying widely in cross-sectional size by suitable choice of the dimensions of the mandrel and dies. For reasons now given, the stripping of tubes of small diameter, or cross section, presents difficulties overcome by use of the guide tube 97, or equivalent. As the stripping operation is performed while the mandrel 21 is free from restraint by the dies and the bending tools, it inherently tends, because of its small cross-sectional area and relatively great length, to flex under the pressure of the stripper 99 and would do so except for the stiffness imparted to it by its engagement with the guide 97. Because of the extreme thinness of the tube wall, or height of the bead on the tube, even a slight bending of the mandrel would be sufficient to preclude consistent stripping of the tubes by flipper 99 since the tip of the stripper 99 would likely ride over the thin end or bead of the tube.

There is herein disclosed and described, but not per se claimed, an automatic monitoring system with which the positive stripping means is suited to coact to stop the machine upon depletion of stock S or failure of the feeding means therefor.

Referring to Fig. 2, when the mandrel 21 is in its foremost position its magnified image or shadow, as formed by a light source 22 and lenses 23 and 24, covers a predetermined area of the sensitive surface of a photo-cell 25, preferably of the CE25 type or equivalent, connected in the input or grid circuit of control tube 26. Notwithstanding the diameter of the electrodes may exceed that of the mandrel by only a very small amount, the difference between the magnitudes of the voltage drop across the output terminals of the tube 25 for the bare mandrel and for the mandrel covered by an electrode is sufficiently great significantly to change the anode current of tube 26. The inspection period, which is very brief at normal speed of operation of the machine, may be set as hereinafter described to occur while the mandrel is clamped between the two die-blocks so that despite any flexibility of the mandrel it is during that time in every cycle of the machine accurately positioned: however, the positioning afforded by guide 97 if accurately dimensioned and aligned is sufficiently definite to allow the inspection period to be selected for any part of the cycle when the mandrel is at rest at the forward end of its stroke.

When the machine for any reason fails to make a tube after one inspection period in replacement of one removed by the flipper 99 there is no electrode C on the mandrel at the inspection station during the next inspection period. In that event, the anode current of control tube 26 during the inspection period is such that solenoid 27, Figs. 2 and 5, is energized to effect release of the clutch pedal 28 of the machine by retraction of latch 29 from engagement with the stop 30 attached to or movable with the clutch pedal. The latch member 29 is mechanically connected to the core or armature 31 of the solenoid and is biased to latching position by the spring 32. When the latch is retracted by solenoid 27, it is locked in the "out" position by a second latch 33 biased to engage a notch or shoulder in latch 29 by a spring or other biasing means.

To initiate operation of the machine, the operator depresses the pedal 28 which effects engagement of the members of a one-cycle clutch (not shown) interposed in usual manner between the drive shaft of the machine and an electrical motor or other source of power and then momentarily depresses pedal 34 to release the locking latch 33 and so allow spring 32 to move the main latch 29 to the right above the stop 30. The operator, after a few cycles, may then release pedal 28 which will be held in its down or operating position for continuous unattended operation of the machine so long as it is fed with tube stock and produces properly formed electrodes therefrom. If in any particular cycle no tube C is transferred to the inspection station in replacement of the one removed from the mandrel by stripper 99 in the prior cycle or if the electrode there is improperly shaped or dimensioned, the solenoid 27 is energized in response to the control action of the photo-cell 25 and control tube 26 to release the pedal 28 and so, by normal action of the one-cycle clutch, stop the machine.

It sometimes happens that in operation of the machine one electrode on the mandrel slightly overlaps another so that upon retraction of the mandrel the end electrode or tube C does not fall off. To detect this condition of telescoping tubes, a contact 35, Figs. 2 and 3, is disposed in line with and suitably beyond the forward limit of travel of the mandrel so that it will be engaged by a telescoped tube extending beyond the inspection station. As more fully later herein described, such engagement of contact 35 so affects the grid potential of the amplifier tube 26 that the solenoid 27 is energized to interrupt further operation of the machine.

Except during the inspection periods, the internal anode-cathode circuit of the amplifier tube 26 is shunted by a circuit including the elongated conductive portion of a commutator or timing switch 36, Figs. 2 and 3, suitably connected to the drive shaft of the machine and operating in constant timed relation to the upper die-block 10 and the mandrel 21. The inspection period may be shifted with respect to the operating cycle of the machine by moving the commutator disc 36, or its associated brush contacts, angularly with respect to the driving shaft of the disc. The resistor 37 is included in the shunt circuit to limit the current flowing through it to reasonably low magnitude: it also has another purpose which is later discussed.

In the monitoring system as thus far described, should the light source 22 fail, as by burn-out of its filament, the photo-tube 25 would improperly interpret the absence of light during the inspection period as proper functioning of the tube-forming machine and would not shut the machine down even should it be operating improperly. To cause the monitor system to supervise operativeness of the light source 22, there is provided in the input circuit of control tube 26 a second photo-tube 38 which receives light from source 22 whether or not an electrode C is on the mandrel at the inspection station. The photo-tubes 25 and 38 are so poled and the voltages applied to them are such that normal anode current flows through the control tube 26 only if two conditions are satisfied; (1) that a predetermined area of the cathode of tube 25 is darkened by the shadow of an electrode C on the mandrel 21 (Fig. 2A) and (2) that cell 38 is receiving light from the source 22 (Fig. 2B). If either of these conditions is not satisfied, the grid potential of the control tube is other than normal during the inspection period and consequently the anode current of the control tube attains a magnitude causing retraction of latch 29 or equivalent by solenoid 27 or similar device. Another advantage of including photo-tube 38 is that should the operator move his hand, for example, toward the die-block while the machine is in operation, the monitor system will promptly stop the machine and so prevent injury to him.

Preferably, all the operating voltages and currents for the photo-tubes, control tube and light source are derived from a single source comprising in the particular arrangement shown, a transformer 39 and a rectifier tube 40. Several low-voltage secondary windings of the transformer supply the currents required by the filaments of the light source 22, the control tube 26 and the rectifier tube 40. The high-voltage secondary of the transformer is connected through the rectifier tube 40 and the filter network 41, preferably through a fuse 42, to the anode-cathode circuit of the control tube 26 and to a bleeder circuit comprising resistors 43 to 47 inclusive from which the direct-current biasing voltages for the two photo-tubes and the grid of the control tube are derived.

The grid of control tube 26 is connected to one terminal of a suitably high resistance 48 whose other terminal is connected to the adjustable contact of the voltage divider 46 included, in the bleeder circuit, between the negative or ground connection and the connection to the cathode of the control tube 26. The latter terminal of resistor 48 is also connected through resistor 49 to the "telescope" contact 35. When contact 35 is engaged by a telescoped electrode C on the grounded mandrel 21, the grid potential of tube 26 becomes more negative than normal and solenoid 27 is energized to trip the one-cycle clutch of the machine.

The anode of photo-tube 38 is connected through resistor 50 to the adjustable contact of the voltage-dividing resistor 44 which is more positive than the cathode of the control tube 26. The cathode of the photo-cell or tube 25 is connected through resistor 51 to the adjustable contact of voltage-dividing resistor 47 which is more negative than the cathode of the control tube 26. The contacts or taps of the resistors 44, 46 and 47 are so positioned or located that under normal conditions of operation of the machine, the anode current of tube 26 is sufficient to energize the relay winding 52 to hold closed its contacts 53, 54 which are in series with the winding 52 and the anode-cathode path within the control tube. The resistor 37 is also of such magnitude that during closure of the tube-shunting circuit by commutator 36 or equivalent the current through the winding 52 of a sensitive relay is sufficient to hold the relay contacts 53 and 54 in engagement.

With the transformer 39 energized, the monitoring system is put into operation by momentarily closing a switch whose contacts 55, 56 are connected respectively to the relay contacts 53, 54. This closure of contacts 55, 56 completes a circuit through the relay winding 52 and its contacts 53, 54 thereupon close to complete a "hold-in" circuit through tube 26 or commutator 36 and the relay therefore remains closed so long as the machine functions properly and the monitoring system is in operative condition.

The meter 58 in circuit with the control tube and the timing-switch 36 is of material assistance in adjusting the optical components of the system and the various biasing voltages. Such adjustments are necessary for example when the die-blocks and mandrel are changed to make tubular electrodes of different shape or size, and the need for readjustment is obvious when it is mentioned that dimension of tube C which is normal to the light path may vary from about 0.025 inch to 0.5 inch or more.

When the power switch 59 is closed, the transformer 39 is energized to light the source 22 and to apply the biasing voltages to the photo-tubes 25, 38 and to the grid of the control tube 26.

The momentary closure of switch 55 by the operator then completes the anode circuit of the control tube and effects energization of relay winding 52, as above described, to complete the seal-in circuit including relay contacts 53, 54. The contacts 61 and 62 of the sensitive relay also concurrently close to effect energization of a power relay 60 through a limiting resistor 63. The contacts 64, 65 of the power relay thereupon close completing a circuit through the lamp 66 or equivalent which so long as it remains lighted indicates to the operator that the monitor is in operative condition. The lamp 67 connected across the line on the output side of the main switch 59 indicates that the system is connected to the primary source of power, for example a 110 volt, 60 cycle line.

When anode current of the control tube falls below normal for any reason—such as (a) no tube C on the mandrel at the inspection station because, for example, of failure of the stock feed, (b) an improperly formed tube C at the inspection station, (c) a burned-out light source or rectifier tube (Fig. 2C)—the contacts 61, 62 of the sensitive relay open to de-energize the power relay 60 whose contact 65 thereupon separates from front-contact 64 to extinguish the light 66 and immediately thereafter engages the back-contact 71 to complete a circuit through the tripping solenoid 27 to stop further operation of the machine as above described.

As the secondary latch 33 moves to hold the primary latch 29 in retracted position, it operates a switch 70 to move its contact 69 out of engagement with its contact 68, thus to de-energize solenoid 27, and into engagement with its contact 72, thus to complete the circuit of an indicator lamp 73 or equivalent. When the operator subsequently depresses pedal 34 to reset the monitor system, contact 69 of switch 70 is moved away from contact 72 to de-energize indicator 73 and into engagement with contact 68 to reconnect the solenoid 27 in circuit with the back-contact 71 of the power relay 60. Switch 70 is held in such position by engagement of latch 33 with the underside of main latch 29 then to the right of the position shown in Fig. 2 to engage the upper face of stop 30 of the depressed clutch pedal 28.

Preferably the lights 66, 67 and 73 are differently colored or at least the color of light 66 is different from that of the other two so that the operator, even though remote from the machine, can readily tell whether or not the machine and monitor are operating properly. For example, both lights 67 and 73 may be red and the light 66 may be green. Preferably, and as shown in Fig. 3, the indicator lights and switches 59 and 57 may be disposed in a control box 74 mounted on the frame member 75 of the machine in position convenient for operation of the monitor switches and for observation of the indicator lamps.

When the drive motor of the machine is supplied from a source other than that for the monitor system, the supply line to the monitor system should be provided with under-voltage relays mechanically or electrically interlocked with switches or relays in the supply line to the driving motor to open its circuit in event of failure of the source supplying the monitor system including the de-clutching solenoid 27. A simple arrangement for that purpose is included in Fig. 2; in brief, the winding of a low-voltage-release relay 104 is excited from the monitor supply source and the contacts of that relay control the supply of current to the drive motor from its source of supply.

Referring to Fig. 4, the light source 22, which may be a 50-candlepower bulb such as used in automobile headlights, is supported from a base member 76 by a bracket 77 and the condenser lens 23 is supported from the base member by the frame 78. The cover 79 of the lamp housing, Figs. 3 and 6, is supported by and held to the posts 80, Fig. 4, extending upwardly from the base 76 and threaded at their upper ends which project through the top of the cover member 79 to receive the clamping nuts, not shown.

Referring to Figs. 3 and 6, the photo-tubes 25, 38 and the control tube 26 are disposed in a housing 81 having a cover 82 removable for convenient replacement of any of these tubes. The apertures 83, 84 in a side wall of the housing are in the paths of light from the source 22 to the cathodes of the photo-tubes 25, 38 respectively. The bracket 85 supports the housing 81 from the frame 75 of the machine. The cable plugs 86 and 87, Fig. 6, cooperate with sockets fastened to the housing to connect the tubes to the relays and to the power supply.

The objective lens 24 is mounted upon a plate 89 adjustably secured to the supporting member 90 suitably fastened to the frame of the machine. Plate 89 is adjustable to provide for accurate positioning of the image of the tube C at the inspection station with respect to the apertures 83, 84, Fig. 2, in housing 81. The lens 24 is more directly supported in a hollow cylinder or tube 24a slidable for focusing adjustment.

Referring to Fig. 5, the relays, power supply and voltage-dividers may be enclosed in a housing 91 located on or adjacent the machine. The tripping solenoid 27 and associated latching mechanisms are supported from the frame of the machine adjacent the clutch pedal 28 within a partial housing 92 whose three-sided cover is omitted from the drawing for visibility of the operating parts.

The discharge chute 93, Figs. 3 and 6, disposed below the inspection station, directs the tubes C as they fall from the retracting mandrel away from accidental bridging engagement with contact 35 and the grounded plate or bracket 90 and diverts them toward the collection receptacle 94 resting in the tray 95 of the machine.

It shall be understood the invention is not limited to the preferred form shown and that changes and modifications within the scope of the appended claims may be made.

What is claimed is:

1. A repeating-cycle tube-forming machine comprising a mandrel reciprocating in each cycle of the machine and having a free end, blanking, forming and finishing dies disposed along said mandrel and operating respectively to cut tube blanks from strip stock, to form from said blanks a row of seamed tubes in end-to-end engagement on said mandrel and to dimension the seamed tubes of said row, stop structure for engaging the last-formed tube of the row normally to effect in successive reciprocations of the mandrel step-by-step advance of the tubes on said mandrel to and beyond said free end thereof, a positive stripping means beyond said finishing dies for preventing the first-formed tube of the row from retracting with the mandrel and stripping it from said free end thereof despite interruption of feed of stock to said blanking dies, and an electrical monitor system including electrical means disposed beyond said positive stripping means and responsive to absence of a tube upon said free end of the mandrel or to presence of a malformed tube thereon for stopping said machine.

2. A repeating-cycle tube-forming machine comprising a mandrel reciprocating in each cycle of the machine and having a free end, blanking, forming and finishing dies disposed along said mandrel and operating respectively to cut tube blanks from strip stock, to form from said blanks a row of seamed tubes in end-to-end engagement on said mandrel and to dimension the seamed tubes of said row, stop structure for engaging the last-formed tube of the row normally to effect in successive reciprocations of the mandrel step-by-step advance of the tubes on said mandrel to and beyond said free end thereof, a positive stripping means beyond said finishing dies for preventing the first-formed tube of the row from retracting with the mandrel and stripping it from said free end thereof despite interruption of feed of stock to said blanking dies, and an electrical monitor system including electrical means disposed beyond said positive stripping means and responsive to absence of a tube upon said free end of the mandrel or to presence of a malformed tube thereon for stopping said machine and including electrical contact means positioned beyond the forward limit of travel of said mandrel for engagement by a tube extending beyond said free end of the mandrel and telescoped with a tube thereon, said electrical monitor system also stopping said machine upon occurrence of such engagement.

3. A repeating-cycle tube-forming machine comprising a flexible mandrel having a free end, means for effecting reciprocation of said mandrel in each cycle and providing a dwell before retraction from the forward limit of its travel, blanking, forming and finishing dies movable to and from said mandrel in each cycle respectively to cut tube blanks from strip stock, to form from said blanks a row of seamed tubes in end-to-end engagement on said mandrel and in succession to dimension the seamed tubes of said row, stop structure for engaging the last-formed tube of the row normally to effect in successive reciprocations of the mandrel step-by-step advance of the tubes on said mandrel to and beyond said free end thereof, a positive stripping means beyond said finishing dies for preventing the first formed tube of the row from retracting with the mandrel and stripping it from said free end thereof despite interruption of feed of stock to said blanking dies, and a monitor system including electrical means disposed beyond said positive stripping means and responsive to absence of a tube upon said free end of the mandrel or to presence of a malformed tube thereon for stopping said machine and including timing means precluding response of said electrical means except when said flexible mandrel is at rest at said forward limit of its travel and is clamped by said dies against flexure.

4. A repeating-cycle tube-forming machine comprising a mandrel having a free end, means for effecting reciprocation of said mandrel in each cycle and providing a dwell thereof before retraction from the forward limit of its travel, blanking, forming and finishing dies movable to and from said mandrel in each cycle respectively to cut tube blanks from strip stock, to form from said blanks a row of seamed tubes in end-to-end engagement on said mandrel and in succession to dimension the seamed tubes of said row, stop structure for engaging the last-formed tube of the row to effect in successive reciprocations of the mandrel step-by-step advance of the tubes on said mandrel toward said free end thereof, a monitor system including electrical means disposed beyond said finishing dies and responsive to absence of a tube upon said free end of the mandrel for stopping said machine and including timing means precluding response of said electrical means except when said flexible mandrel is at rest at said forward limit of its travel, and a positive stripping means disposed between said finishing dies and said electrical means for preventing the first-formed tube of the row from retraction with said mandrel and stripping it therefrom subsequent to checking of the free end thereof for absence of a tube by said electrical means.

BENJAMIN M. NASE.

REFERENCES CITED

The following references are of record in the file of this patent:

UNITED STATES PATENTS

| Number | Name | Date |
| --- | --- | --- |
| 525,438 | Belding | Sept. 4, 1894 |
| 611,222 | Ries | Sept. 20, 1898 |
| 1,476,796 | Bundy | Dec. 11, 1923 |
| 1,525,080 | Magidson | Feb. 3, 1925 |
| 1,629,813 | Stevenson | May 24, 1927 |
| 1,770,041 | Peters | July 8, 1930 |
| 1,811,580 | Goldsborough | June 23, 1931 |
| 1,863,770 | Hendrickson | June 21, 1932 |
| 1,997,272 | Adams | Apr. 9, 1935 |
| 2,116,971 | Haslauer | May 10, 1938 |
| 2,333,997 | Glans | Nov. 9, 1943 |
| 2,381,505 | Lindholm | Aug. 7, 1945 |